(12) United States Patent
Tobin (10) Patent No.: US 10,890,965 B2
(45) Date of Patent: Jan. 12, 2021

(54) DISPLAY ORIENTATION ADJUSTMENT USING FACIAL LANDMARK INFORMATION

(75) Inventor: John Patrick Edgar Tobin, San Jose, CA (US)

(73) Assignee: eBay Inc., San Jose, CA (US)

( * ) Notice: Subject to any disclaimer, the term of this patent is extended or adjusted under 35 U.S.C. 154(b) by 455 days.

(21) Appl. No.: 13/586,307

(22) Filed: Aug. 15, 2012

(65) Prior Publication Data
US 2014/0049563 A1 Feb. 20, 2014

(51) Int. Cl.
*G06T 3/60* (2006.01)
*G06F 3/01* (2006.01)

(52) U.S. Cl.
CPC .............. *G06F 3/012* (2013.01); *G06F 3/017* (2013.01); *G06F 2200/1614* (2013.01)

(58) Field of Classification Search
None
See application file for complete search history.

(56) References Cited

U.S. PATENT DOCUMENTS

| 4,729,652 A | 3/1988 | Effert | |
|---|---|---|---|
| 2002/0021278 A1 | 2/2002 | Hinckley et al. | |
| 2002/0136433 A1* | 9/2002 | Lin | G06K 9/00295 382/118 |
| 2005/0066192 A1* | 3/2005 | Handy Bosma | H04L 63/083 726/4 |
| 2005/0187437 A1* | 8/2005 | Matsugu | A61B 5/16 600/301 |
| 2006/0128438 A1 | 6/2006 | Balle et al. | |
| 2006/0193502 A1* | 8/2006 | Yamaguchi | G06K 9/00288 382/118 |
| 2006/0265442 A1* | 11/2006 | Palayur | G06F 1/1626 708/200 |
| 2006/0287083 A1 | 12/2006 | Ofek et al. | |

(Continued)

FOREIGN PATENT DOCUMENTS

| CN | 102541259 A | * 7/2012 | G06K 9/00 |
|---|---|---|---|
| EP | 1309189 A2 | 5/2003 | |

(Continued)

OTHER PUBLICATIONS

Tao et al, "Biometric Authentication for a Mobile Personal Device", IEEE 3rd Annual Intl Conf on Mobile and Ubiquitous Systems, 2006.*

(Continued)

*Primary Examiner* — Patrick F Valdez
(74) *Attorney, Agent, or Firm* — Mintz Levin Cohn Ferris Glovsky and Popeo, P.C.

(57) ABSTRACT

Systems and methods disclosed herein may operate to adjust display orientation of a user device based on facial landmark information. In various embodiments, information identifying and describing a facial landmark of a user may be received via a user device corresponding to the user. Head orientation of the user may be determined based at least in part on the information identifying and describing the facial landmark. A display unit of the user device may be automatically signaled to align display orientation of contents being presented with the head orientation as determined based at least in part on the information identifying and describing the facial landmark.

17 Claims, 9 Drawing Sheets

(56) References Cited

U.S. PATENT DOCUMENTS

| | | | |
|---|---|---|---|
| 2007/0215018 A1* | 9/2007 | Faries, Jr. | E05B 47/026 109/23 |
| 2009/0116684 A1* | 5/2009 | Andreasson | G06F 17/30764 382/100 |
| 2009/0186659 A1 | 7/2009 | Platzer | |
| 2009/0189830 A1 | 7/2009 | Deering et al. | |
| 2010/0007603 A1 | 1/2010 | Kirkup | |
| 2010/0069115 A1 | 3/2010 | Lin | |
| 2010/0125816 A1* | 5/2010 | Bezos | 715/863 |
| 2010/0238194 A1 | 9/2010 | Roach, Jr. | |
| 2010/0328492 A1* | 12/2010 | Fedorovskaya et al. | 348/231.2 |
| 2011/0032220 A1 | 2/2011 | Shih et al. | |
| 2011/0035662 A1 | 2/2011 | King et al. | |
| 2011/0158546 A1 | 6/2011 | Huang et al. | |
| 2011/0273369 A1 | 11/2011 | Imai et al. | |
| 2011/0298829 A1* | 12/2011 | Stafford et al. | 345/659 |
| 2011/0310237 A1* | 12/2011 | Wang | G06K 9/00315 348/77 |
| 2012/0081282 A1* | 4/2012 | Chin | G06F 3/011 345/156 |
| 2012/0113211 A1* | 5/2012 | Yi | H04N 7/14 348/14.07 |
| 2013/0015946 A1* | 1/2013 | Lau et al. | 340/5.2 |
| 2013/0057571 A1* | 3/2013 | Harris | 345/619 |
| 2013/0057573 A1* | 3/2013 | Chakravarthula et al. | 345/619 |
| 2013/0097695 A1* | 4/2013 | Sipe | G06F 9/4451 726/17 |
| 2013/0162524 A1* | 6/2013 | Li | G06K 9/00 345/156 |
| 2013/0326613 A1* | 12/2013 | Kochanski | G06F 21/32 726/19 |

FOREIGN PATENT DOCUMENTS

| | | |
|---|---|---|
| EP | 2428864 A2 | 3/2012 |
| WO | WO-2014028752 A1 | 2/2014 |

OTHER PUBLICATIONS

"Apple Invents a Killer 3D Imaging Camera for IOS Devices", [Online]. Retrieved from the Internet: <http://www.patentlyapple.com/patently-apple/2012/03/apple-invents-a-killer-3d-imaging-camera-for-ios-devices.html>, (Mar. 29, 2012), 9 pg.

"International Application Serial No. PCT/US2013/055163, International Preliminary Report on Patentability dated Feb. 26, 2015", 6 pgs.

"International Application Serial No. PCT/US2013/055163, International Search Report dated Oct. 16, 2013", 3 pgs.

"International Application Serial No. PCT/US2013/055163, Written Opinion dated Oct. 16, 2013", 4 pgs.

Cheng, Lung-Pen, et al., "iRotate: Automatic Screen Rotation based on Face Orientation", (May 5-10, 2010), 8 pages.

* cited by examiner

DISPLAY ORIENTATION ADJUSTMENT USING FACIAL LANDMARK INFORMATION

TECHNICAL FIELD

The present application relates generally to the technical field of graphic user interface management and, in various embodiments, to systems and methods for managing a display unit of a user device.

BACKGROUND

Various types of user devices, such as smartphones and tablet computers, are now used on a daily basis for business or non-business transactions. Conventionally, for example, when a user device is rotated from a portrait position to a landscape position and vice versa, the orientation of contents, such as pages, being presented on a display of the user device is also automatically rotated so that the orientation of texts or images of the contents remain substantially the same (e.g., substantially horizontal to the ground). For example, in the case of a portable user device (e.g., a smartphone or tablet computer) including a (e.g., a 2.25×3.75 inch) display, the display may be rotated from one position (e.g., a portrait position (width: 2.25 inches and height: 3.7 inches)) to another position (e.g., a landscape position (width: 3.7 inches and height 2.25 inches)). Upon rotation of the display, the contents (e.g., web pages or local documents) being presented on the display may also be automatically orientated to accommodate the display rotation. Accordingly, under existing display (e.g., screen) orientation technologies, the orientation of contents being displayed remains unchanged, being aligned with an assumed user's horizontal line of view (e.g., a left-to-right direction) regardless of the orientation of the user device or the display thereof.

BRIEF DESCRIPTION OF THE DRAWINGS

Some embodiments are illustrated by way of example and not by way of limitation, in the figures of the accompanying drawings.

DETAILED DESCRIPTION

Example methods, apparatuses, and systems to adjust display orientation of a user device based on facial landmark information of a user using the user device are disclosed herein. In the following description, for purposes of explanation, numerous specific details are set forth in order to provide a thorough understanding of the present disclosure. It may be evident, however, to one skilled in the art, that the subject matter of the present disclosure may be practiced without these specific details.

While convenient in some situations, the above-described existing technologies are inconvenient in other cases, and may degrade user experience in using the user device. This may be attributed to the fact that existing display (e.g., screen) orientation technologies do not take into consideration the head (or facial landmark, such as eyes) orientation of the user in automatically adjusting display (e.g., screen) orientation of the user device. In reality, the orientation of the user's head or eyes may not be fixed in one direction while the user device is being used. Instead, the head orientation of the user may be dynamically changed, for example, from a vertical direction to a horizontal direction and vice versa. Thus, at least because of the lack of consideration of the head (e.g., eyes) information, the existing display orientation technologies may render it difficult to view automatically rotated contents (e.g., texts or images) from certain postures.

For example, when the user stands or sits upright, the head orientation of the user may become substantially vertical (e.g., top-to-bottom), making his eyes oriented substantially horizontal (e.g., left-to-right). However, when the user leans laterally or lies on his side, for example, on a bed, sofa or floor, the head orientation may become non-vertical, such as diagonal or substantially horizontal (e.g., left-to-right), making the eye orientation diagonal or substantially vertical (e.g., bottom-to-top). In such a case, under the existing technologies, the orientation of the contents being presented on the display may remain substantially horizontal (e.g., left-to-right) regardless of the change in the eye orientation of the user, for example, from the horizontal direction to the diagonal or vertical direction.

This causes inconvenience for the user who wants to view the contents on the user device while standing, sitting, or lying with his head oriented in a non-straight direction (e.g., substantially vertical). This is because the orientation of the contents being displayed (e.g., left-to-right) is not aligned with the orientation of the eyes of the user (e.g., bottom-to-top or substantially angled, such as 30 or 40 degrees, from the vertical or horizontal line). Accordingly, under the existing technologies, the user may need to change his posture so that his head gets oriented substantially vertical (e.g., with eye orientation being left-to-right) to view the contents on the display efficiently.

Methods, apparatuses, and systems, according to various embodiments, may solve these problems and other problems, for example, by using head orientation of the user in adjusting the display orientation of the user device. The head orientation of the user may be determined based on information identifying and describing locations, orientation, or shapes of one or more facial landmarks, such as hair, forehead, eye brows, eyes, ears, nose, mouth, cheeks, chins and so on. When the head orientation is determined (e.g., substantially vertical; diagonal beyond a specified threshold, such as ten (10), thirty (30) or forty-five (45) degrees; or horizontal), the display of the user device may be automatically adjusted to align display orientation of contents with the head orientation as determined based at least in part on the information identifying and describing the facial landmark. In certain embodiments, the user device may determine an angular orientation of the user device and/or the head of the user, and factor this angle into the display orientation calculations. This allows the user to view the contents being presented on the display more comfortably and efficiently from any posture (e.g., lying on a bed on his side, sitting on a sofa with his head tilted laterally, and so on) without having to change his body posture to align his head substantially vertical. This, in turn, may enhance user experiences in using the user device.

In various embodiments, information identifying and describing a facial landmark of a user may be received via a user device corresponding to the user. Head orientation of the user may be determined based at least in part on the information identifying and describing the facial landmark. A display unit of the user device may be automatically signaled to align display orientation of contents being presented with the head orientation as determined based at least in part on the information identifying and describing the facial landmark. Various embodiments that incorporate these mechanisms are described below in more detail with respect to FIGS. 1-7.

Figure 1A:
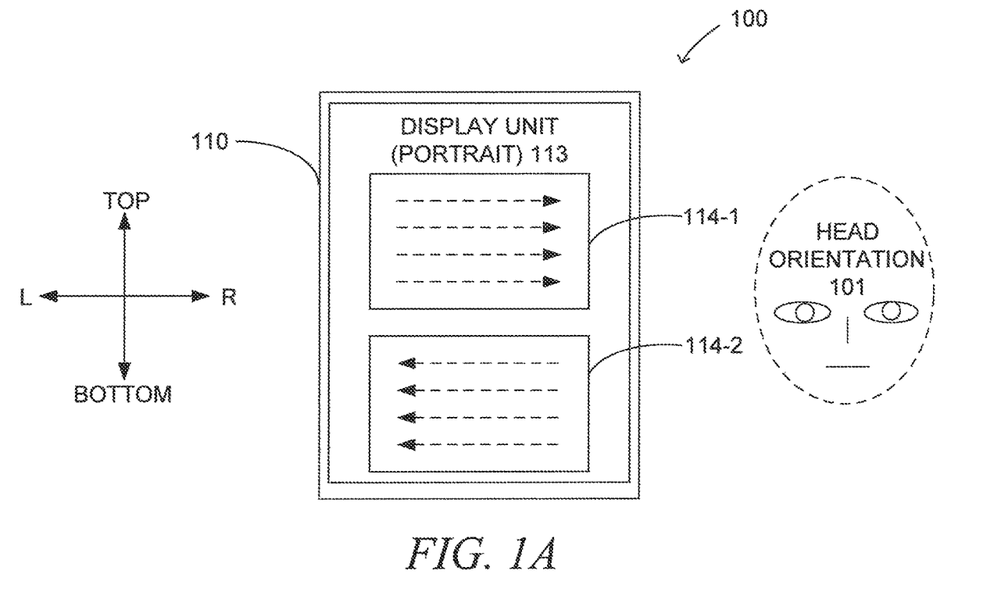
FIGS. 1A-1D are schematic diagrams illustrating example display orientation adjustments based on facial landmark information, according to various embodiments.

FIGS. 1A-1D show schematic diagrams 100 illustrating example display orientation adjustments based on facial landmark information, according to various embodiments. Referring to FIG. 1A, in various embodiments, a display unit 113 of a user device 110, such as a personal computer (PC), notebook, netbook, tablet PC, server, cell phone (e.g., smartphone), personal digital assistant (PDA), television (TV), set top box and so on, may be oriented at a first (e.g., portrait) position. Head orientation 101 may be determined to be substantially vertical (e.g., with eye orientation being left-to-right). In this scenario, contents 114-1, 114-2 being presented on the display unit 113 may be aligned such that texts or images of the contents are oriented substantially horizontal (e.g., left-to-right), as indicated by the dotted arrow lines in an upper portion 114-1 of the contents. In various embodiments, when the contents 114-1, 114-2 are determined to be related to languages (e.g., Arabic, Chinese or Japanese) where a reading direction is different from western cultures, then the display orientation of the contents may be aligned such that the texts or images of the contents are read or viewed from a corresponding direction (e.g., right-to-left), as indicated by the dotted arrow lines in a lower portion 114-2 of the contents.

Figure 1B:
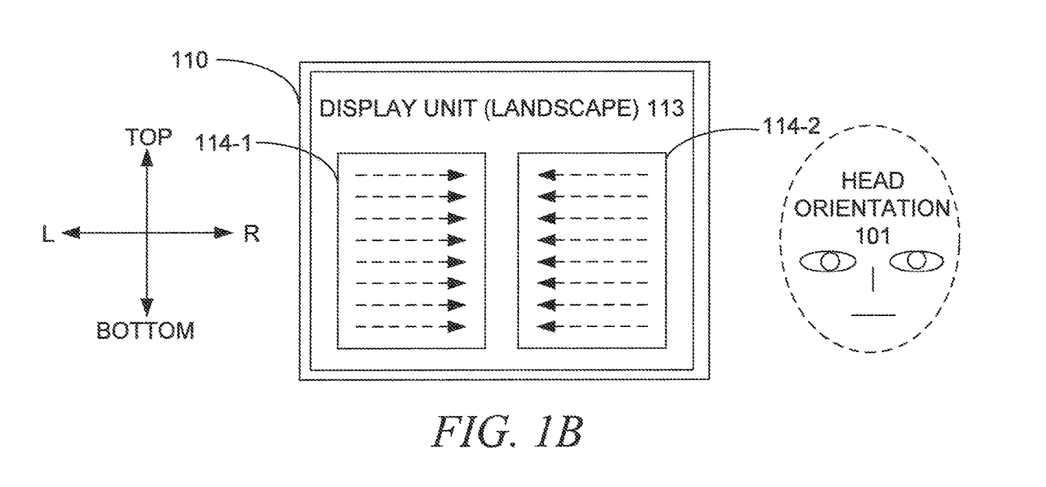

Referring to FIG. 1B, in various embodiments, the orientation of the display unit 113 may be changed into from the first position in FIG. 1A to a second (e.g., landscape) position, for example, upon rotation of the user device 110 by a user who uses the user device 110. The head orientation 101 may be determined to be substantially vertical (e.g., with eye orientation being left-to-right). In this scenario, the contents being presented on the display unit 113 may be automatically aligned such that the texts or images of the contents remain substantially horizontal, such as left-to-right (as indicated by the dotted arrow lines in a left portion 114-1 of the contents) or right-to-left (as indicated by the dotted arrow lines in a right portion 114-2 of the contents).

Figure 1C:
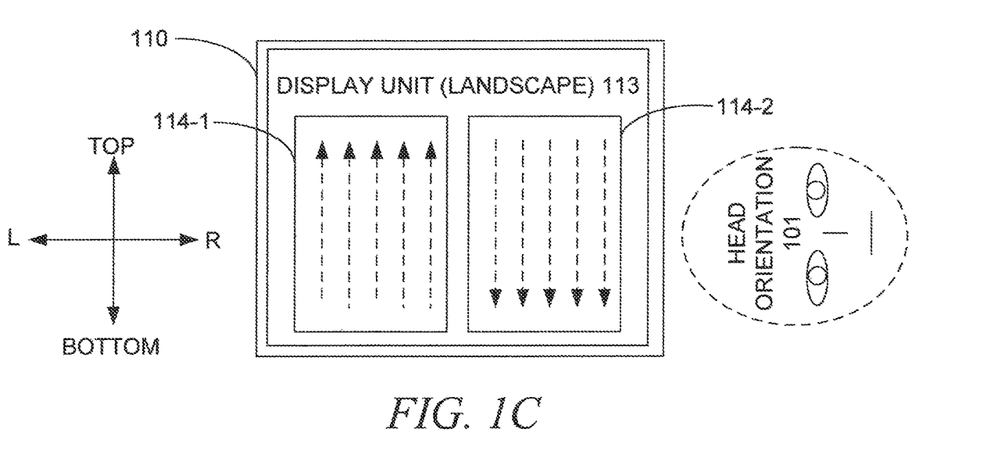

Referring to FIG. 1C, in various embodiments, the orientation of the display unit 113 may be oriented at the second (e.g., landscape) position. This time, the head orientation 101 may be determined to be substantially horizontal (e.g., with eye orientation being bottom-to-top), for example, upon the user of the user device 110 lying on a bed or sofa on his side. In this scenario, the contents being presented on the display unit 113 may be automatically aligned based at least in part on the (horizontal) head orientation 101. For example, the texts or images of the contents may be oriented substantially vertical, such as bottom-to-top (as indicated by the dotted arrow lines in a left portion 114-1 of the contents) or top-to-bottom (as indicated by the dotted arrow lines in a right portion 114-2 of the contents).

Figure 1D:
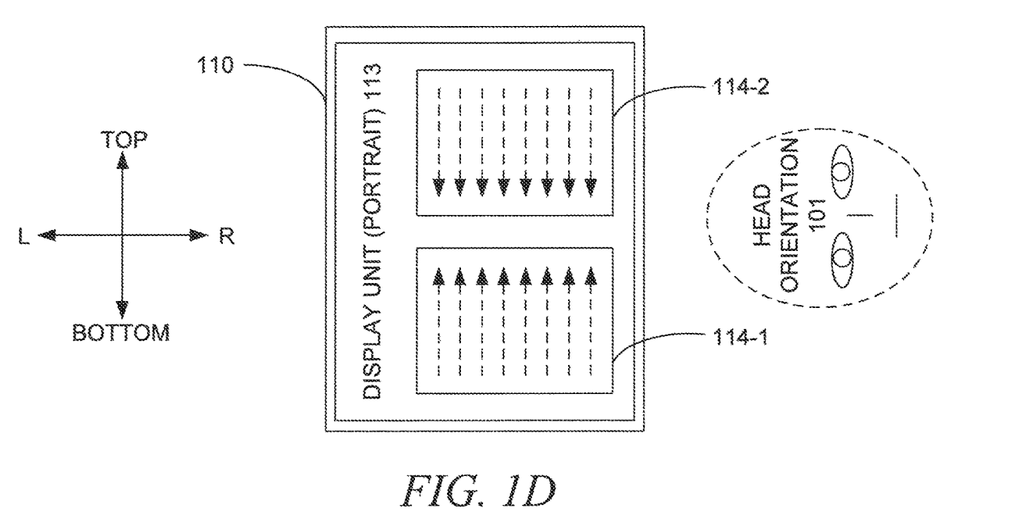

Referring to FIG. 1D, in various embodiments, the orientation of the display unit 113 may be oriented at the first (e.g., portrait) position. This time, the head orientation 101 may be determined to be substantially horizontal (e.g., with eye orientation being bottom-to-top), as described with respect to FIG. 1C. In this scenario, the contents being presented on the display unit 113 may be automatically aligned based on the (horizontal) head orientation 101. For example, the texts or images of the contents may be oriented substantially vertical, such as bottom-to-top (as indicated by the dotted arrow lines in a lower portion 114-1 of the contents) or top-to-bottom (as indicated by the dotted arrow lines in an upper portion 114-2 of the contents).

In various embodiments, each of the four combinations of the display orientations and head orientations shown in FIGS. 1A-1D, may be taken from any other combinations shown in FIGS. 1A-1D or additional combinations (e.g., the display unit 113 being oriented tilted at some angle between the vertical and horizontal directions) and vice versa. Still, the functionality of adjusting display orientation based on the head orientation may be substantially equally applied. This allows overriding the display orientation adjustment effects caused by the change in the orientation of the display unit 113 (e.g., from the portrait to landscape positions). More explanations regarding the structures and functions of the user device 110 are provided below with respect to FIGS. 2-7.

Figure 2A:
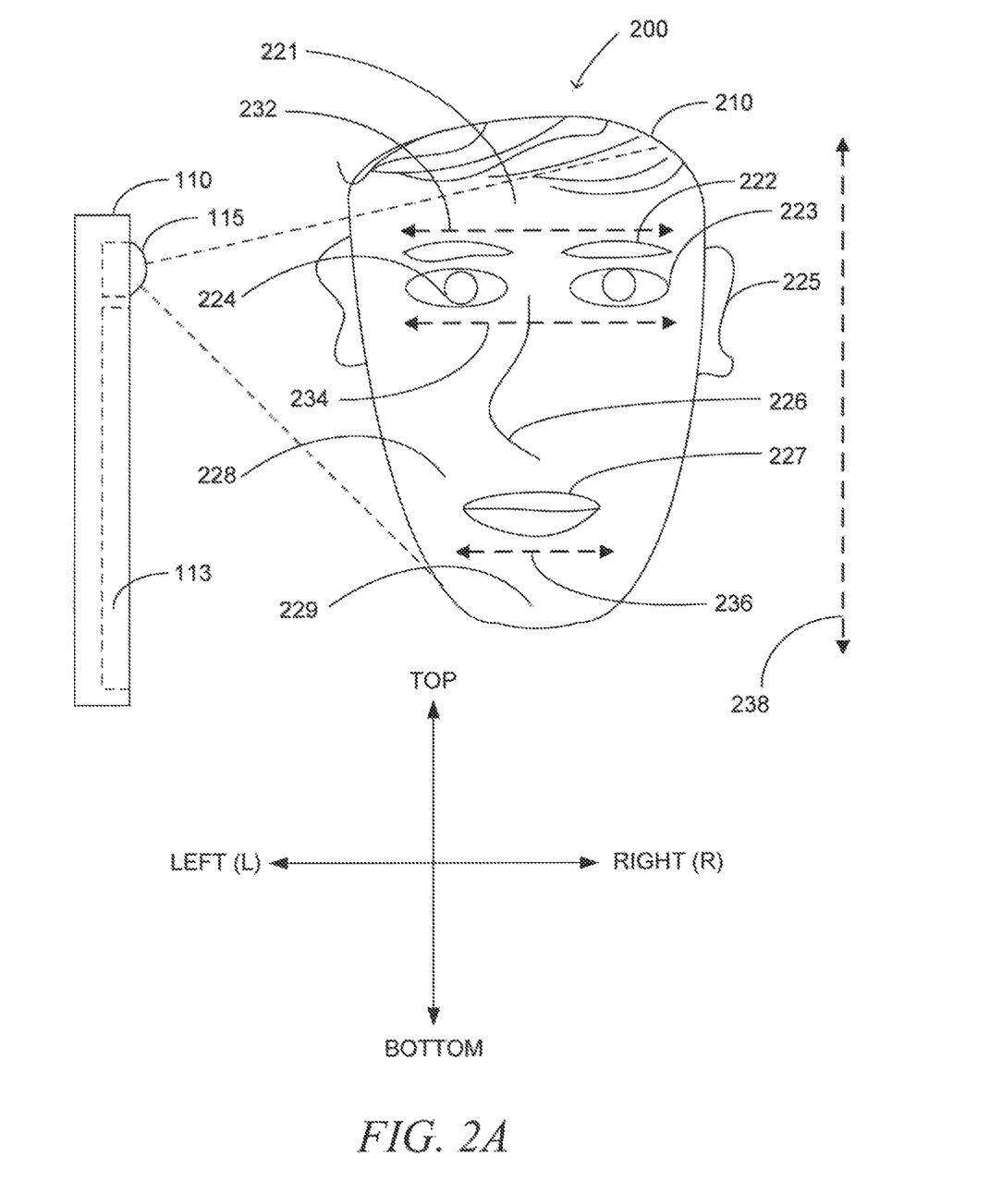
FIG. 2A is a schematic diagram illustrating a system for adjusting display orientation based on facial landmark information, according to various embodiments.

FIG. 2A is a schematic diagram 200 illustrating a system for adjusting display orientation based on facial landmark information (e.g., head orientation), according to various embodiments. The user device 110 may comprise a front-facing camera) 115 facing the same side (e.g., the user) as the display unit 113. The front-facing camera 115 may capture one or more (e.g., facial) images (e.g., pictures or streaming videos) of the user who uses the user device 110. Based at least in part on analyzing the captured images, the front-facing camera 115 may extract information identifying and describing facial landmarks of the user, such as hairs 210, forehead 221, eye brows 222, eyes 223, pupils 224, ears 225, nose 226, mouth 227, cheeks 228, and chin 229. In addition and/or alternatively, in various embodiments, other information identifying and describing other facial landmarks, such as eyeglasses, facial wrinkles, teeth and so on, or non-facial landmarks, such as neck, shoulders and so on, may be extracted from the captured images.

In various embodiments, based on the information identifying and describing facial or non-facial landmarks, orientations of a corresponding one of the facial or non-facial landmarks of the user may be determined. For example, as shown in FIG. 2A, eye brows orientation 232, eye orientation 234, and mouth orientation 236 may be determined. It is noted that although not shown in FIG. 2A, additional orientation of other (facial or non-facial) body parts may also be determined. Based at least in part on at least one orientation (e.g., the eye orientation 234) of the orientations, a head orientation 238 may be further determined. When the head orientation 238 is determined, the display orientation of the display unit 113 may be adjusted based at least on the head orientation 238, for example, as described above with respect to FIGS. 1A-1D.

In various embodiments, other sensors may be employed in addition to and/or alternatively to the front-facing camera 115, for example, to capture the facial or non-facial landmark images and analyze them. In certain embodiments where the user device 110 does not include sensors, such as a front facing camera, a user-interface control may be included to allow a user to indicate his head orientation.

Figure 2B:
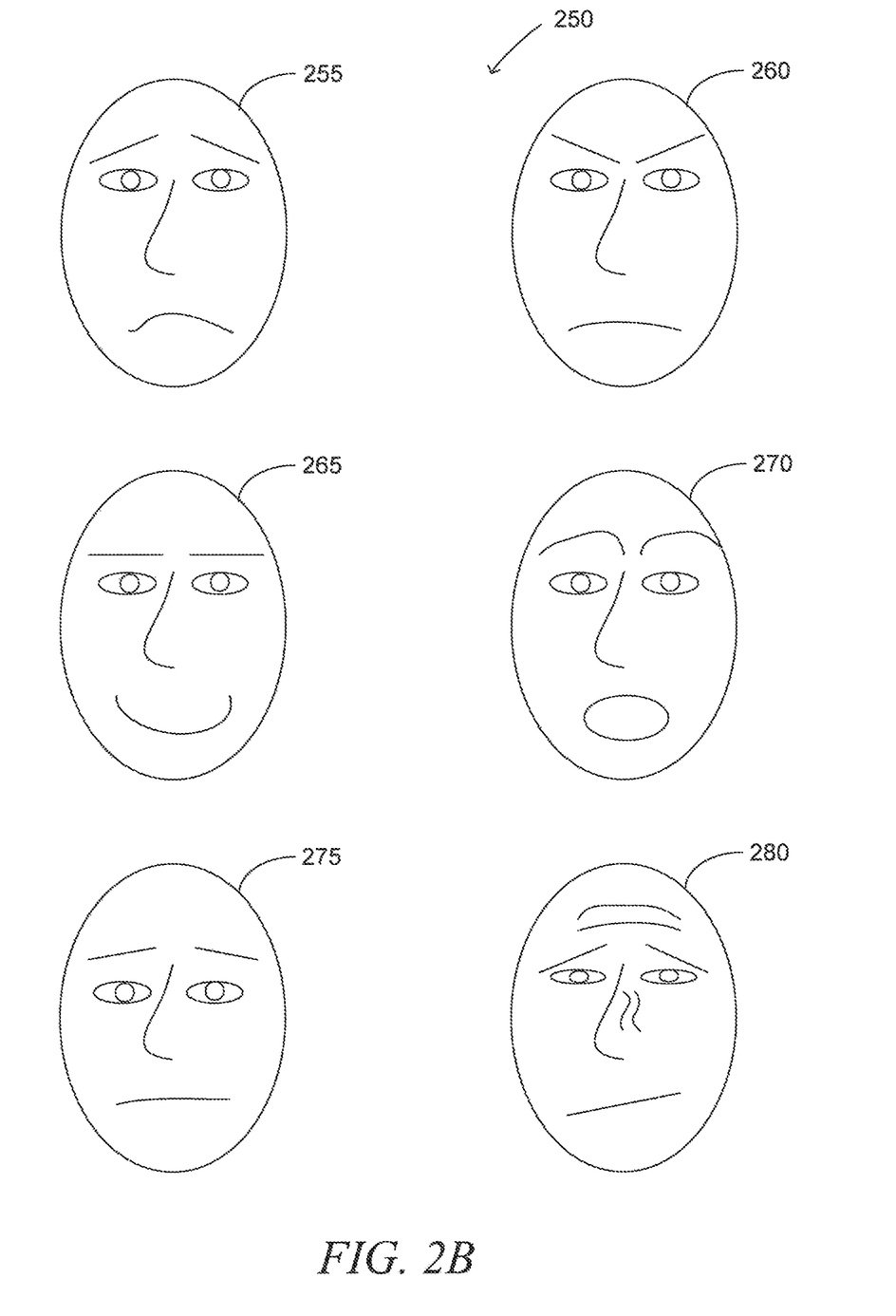
FIG. 2B are schematic diagrams illustrating example facial expressions to be identified, according to various embodiments.

FIG. 2B shows schematic diagrams 250 illustrating example facial expressions 255-280 to be identified, according to various embodiments. A plurality of facial expressions of the user may be determined based at least in part on analyzing the information identifying and describing the facial landmarks of the user, such as the eye brows orientation 232, eye orientation 234, and mouth orientation 236. In addition and/or alternatively to orientation information, other information with respect to one or more of the facial landmarks, such as a (e.g., mouth) shape, (e.g., eye brows or mouth) angle/tiltedness, (e.g., pupil) size, (e.g., cheek) definition, (e.g., eye) open/closed status, (e.g., nose or forehead) wrinkle, and so on, may be used to determine the facial expressions.

In various embodiments, for example, Key Point Indicators (KPIs) technologies may be employed to recognize the head orientations or facial expressions of the user. The KPIs may comprise known facial recognizable reference points comprising a multitude of informational locations of facial landmarks (e.g., hairs, eyeglasses, eyes, ears, nose, mouth, and cheeks) that are expected to be aligned in a certain manner. In one embodiment, information regarding such facial recognizable reference points may be captured, for example, via the front-facing camera 115 redundantly to enhance the probability of success in determining head orientation or facial expressions of the user.

For example, in various embodiments, as shown in FIG. 2B, sad 255, angry 260, happy 265, surprised 270, puzzled 275, and frown or squint 280 expressions may be identified. Other facial expressions, such as a wink (e.g., with only one eye being closed) or a kiss (e.g., with the mouth being substantially round and/or protruding), may be identified in other embodiments. In various embodiments, one or more of these facial expression may be identified as a result of comparing captured facial landmark information (e.g., shape, angle/tiltedness, size, definition, open/closed status, wrinkle, and so on) of a user with reference facial landmark information.

In one embodiment, for example, preregistered facial landmark information (e.g., a facial image taken in advance) of the user may be used as the reference facial landmark information. In another embodiment, for example, one existing facial image may be selected, as the reference facial image, from a plurality of existing facial images stored in the user device based at least in part on the user's facial image taken during the preregistration. Although some of the example facial expressions 255-280 are shown to have one or more corresponding facial landmarks (e.g., eye brows or mouth) tilted in a certain direction for explanation and clarity, other directions may be used. For example, in one embodiment, the mouth in the frown or squint 280 expression may be identified as being tilted from upper left to lower right (e.g., as indicated by "\" symbol) instead of being tilted from lower left to upper right, as currently indicated by "/" symbol.

In various embodiments, a three-dimensional (3D) imaging camera may be employed as the front-facing camera 115 to capture data to be used in determining the facial expressions 255-280. When determined, in various embodiments, these facial expressions 255-280 may be used to select and activate a certain function from a plurality of functions provided by the user device 110. More explanations regarding such embodiments are provided below with respect to FIGS. 3-6.

Figure 3:
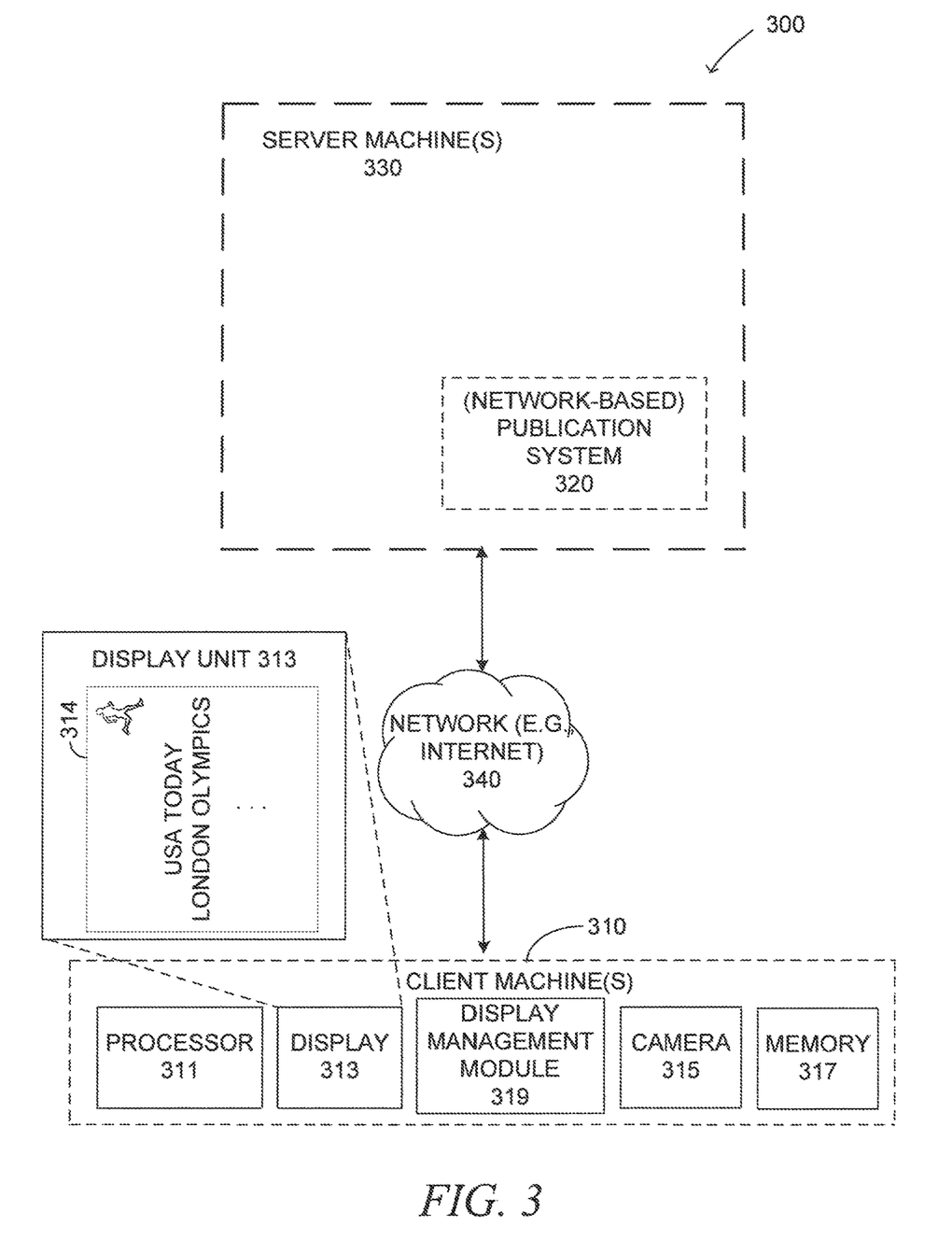
FIG. 3 is a block diagram illustrating a system in a network environment for adjusting display orientation based on facial landmark information, according to various embodiments.

FIG. 3 shows a block diagram illustrating a system 300 in a network environment for adjusting display orientation based on facial landmark information, according to various embodiments. The system 300 may include one or more server machines 330 connected through a network (e.g., the Internet) 340 to one or more client machines 310 (e.g., the user device 110). In various embodiments, for example, each of the one or more client machines 310 may comprise a user device, such as a PC, notebook, netbook, tablet PC, server, cell phone (e.g., smartphone), PDA, TV, set top box, or the like.

The server machines 330 may comprise a network-based publication system 320, such as a network-based trading platform. In various embodiments, the network-based trading platform may provide one or more marketplace applications, payment applications, and other resources. The marketplace applications may provide a number of marketplace functions and services to users that access the marketplace. The payment applications, likewise, may provide a number of payment services and functions to users. The network-based trading platform may display various items listed on the trading platform.

The embodiments discussed in this specification are not limited to network-based trading platforms, however. In other embodiments, other web service platforms, such as a social networking websites, news aggregating websites, web portals, network-based advertising platforms, or any other systems that provide web services to users, may be employed. Furthermore, more than one platform may be supported by the network-based publication system 320, and each platform may reside on a separate server machine 330 from the network-based publication system 320.

The client machine 310 may host a display management module 319. In various embodiments, the display management module 319 may comprise a web browser or a gadget application that operates in a background of the computing environment of the client machine 310 or a combination thereof. The client machine 310 may be configured to permit its user to access the various applications, resources, and capabilities of the web services, for example, provided by the network-based publication system 320 via the display management module 319.

For example, in various embodiments, facial landmark information (e.g., eye orientation) of a user of the client machine 310 may be captured and received via a camera 315 (e.g., the front-facing camera 115), for example, as explained with respect to FIGS. 1A-1B. The display management module 319 may determine head orientation of the user based at least in part on the facial landmark information. The display management module 319 may further adjust display orientation of contents 314 (e.g., the contents 114-1, 114-2) being displayed on a display 313 (e.g., the display unit 113) based on the determined head orientation of the user, for example, as explained with respect to FIGS. 2A-2C. More information regarding the display management module 319 is provided below with respect to FIGS. 4-6.

In one embodiment, the contents 314 may be data provided via the network (e.g., the Internet) 340, for example, from the network-based publication system 320. In another embodiment, the contents 314 may be locally provided without going through the network 340, for example, via an external storage device, such as a Universal Serial Bus (USB) memory, a Digital Versatile/Video Disc (DVD), a Compact Disc (CD), or a Blu-ray Disc (BD). In various embodiments, the display 313 to present the contents 314 may comprise a touch screen device capable of capturing a user's finger or electronic pen movements thereon.

The client machine 310 may also comprise a processor 311 and memory 317. The processor 311 may provide processing capacity for the client machine 310, including the display management module 319, and the memory 317 may comprise a storage device to store data (e.g., the facial landmark information of the user) to be processed by the processor 311. In various embodiments, the memory 317 may store data identifying and describing facial landmarks of a plurality of other users, for example, to be compared with the facial landmark information of the user.

In other embodiments, the memory 317 may store information identifying and describing each individual user's facial recognizing features. Using the individual user's facial recognizing feature information allows, for example, the display management module 319 to be configured and customized for each user such that facial recognition can be enabled on a user basis. For example, in the case of the client machine 310 being a tablet PC shared by family members, each member's facial recognition feature information may be registered in advance. Upon activation by a current user, the client machine 310 may capture the current user's facial landmark information, and compare it with the preregistered facial recognizing feature information of the family members. If a match is found, then the automatic display adjustment based on the current user's facial landmark information may be activated. If no match is found, then the automatic display adjustment may not be activated.

In various embodiments, it may be determined, as a result of the comparison, whether the current user is an owner family member (e.g., a father), or a non-owner family member (e.g., a child) who is merely allowed by the owner family member to use the client machine 310. When determined as the owner member, the current user may access all resources of the client machine 310 without any restrictions. When determined as the non-owner member, however, at least a portion of information (e.g., the owner member's personal information or other contents designated by the owner member) or resources (e.g., online payment function), may be disabled. More information regarding the processor 311 and the memory 317 is provided below with respect to FIG. 7.

It is noted that while FIG. 3 illustrates the client machine 310 and the server machine 330 in a client-server architecture, other embodiments are not limited to this architecture, and may equally find applications in a distributed, peer-to-peer, or standalone architectures.

Figure 4:
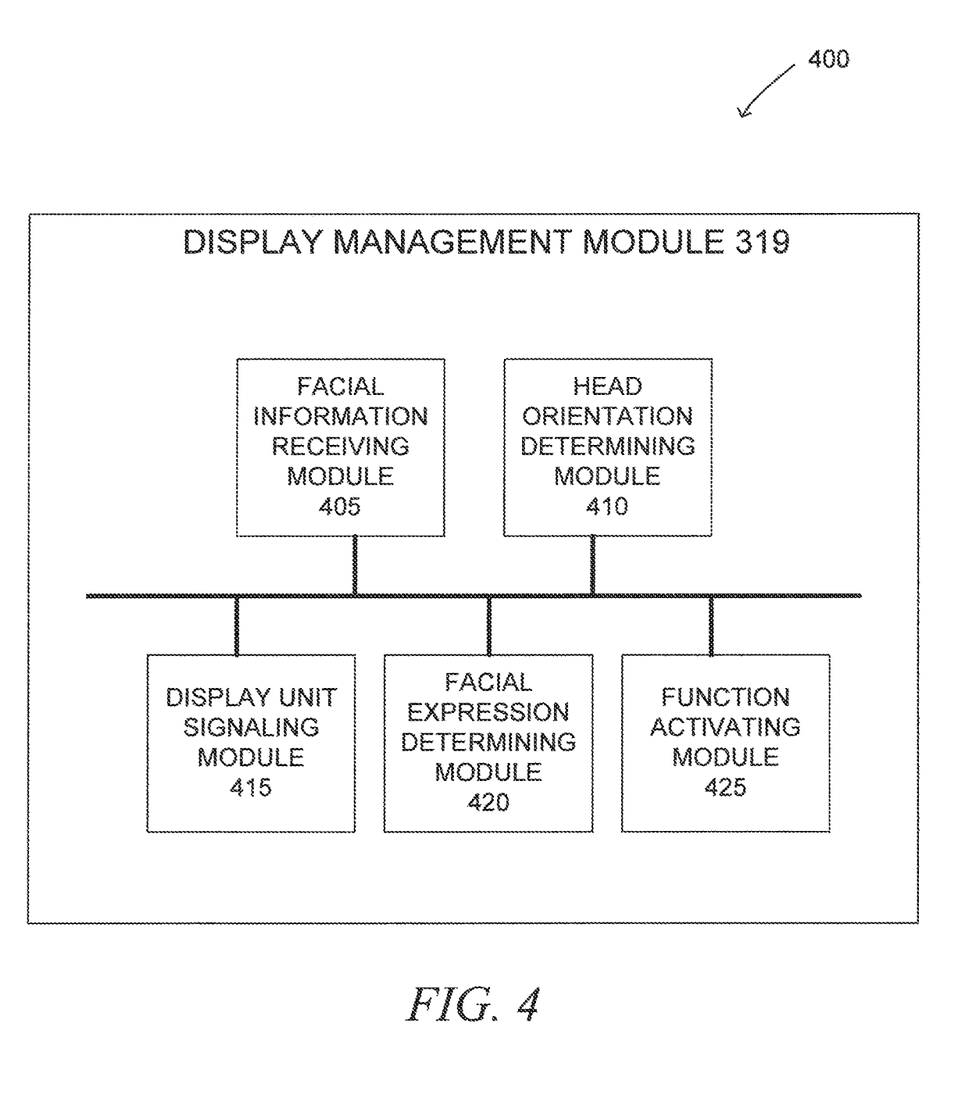
FIG. 4 is a schematic diagram illustrating a user interface of a user device to execute display orientation adjustment, according to various embodiments.

FIG. 4 is a schematic diagram 400 illustrating a user interface (e.g., the display management module 319) of the client machine 310 (e.g., the user device 110) to execute display orientation adjustment, according to various embodiments. The display management module 319 may comprise a facial information receiving module 405, a head orientation determining module 410, a display unit signaling module 415, a facial expression determining module 420, and a function activating module 425.

In various embodiments, the facial information receiving module 405 may receive information identifying and describing a facial landmark (e.g., eyes, eye brows, mouth, or nose) of a user using a user device (e.g., the client machine 310) that includes the display management module 319.

In various embodiments, the information identifying and describing the facial landmark of the user may be captured by and received from a camera (e.g., the camera 315, such as the front-facing camera 115) installed in the user device. In one embodiment, for example, the camera may comprise a front-facing camera that is located on the front side of the user device, facing the user so that it may be able to capture the user's face, including the information identifying and describing the facial landmark.

In various embodiments, the information identifying and describing the facial landmark may comprise information identifying and describing at least one of hairs, eyebrows, eyes, glasses, ears, a forehead, a nose, or a mouth of the user.

In various embodiments, the head orientation determining module 410 may determine head orientation of the user based at least in part on the information identifying and describing the facial landmark. In one embodiment, for example, the head orientation determining module 410 may determine the head orientation based at least in part on (e.g., closed, wrinkled, or open) shape and (e.g., horizontal, vertical, or diagonal) position information included in the information identifying and describing the facial landmark.

In various embodiments, the head orientation determining module 410 may determine the head orientation of the user based at least in part on comparing the facial landmark of the user with at least a portion of facial landmarks of a plurality of other users, for example, previously stored in the memory 317. In For example, in various embodiments, the head orientation determining module 410 may receive information identifying and describing a plurality of facial landmarks of the user; calculate, based on the information identifying and describing the plurality of facial landmarks of the user, a relative location for each of the plurality of facial landmarks; and then determine the head orientation based at least in part on the relative location for each of the plurality of facial landmarks.

In various embodiments, the display unit signaling module 415 may automatically signal a display unit (e.g., the display 313) to align display orientation of contents (e.g., the contents 314) being presented on the display unit with the head orientation of the user as determined based at least in part on the information identifying and describing the facial landmark.

For example, in one embodiment, the head orientation of the user may be determined to be substantially horizontal or diagonal rather than vertical, such as when the user is lying on a bed or leaning laterally on a sofa. In such a case, as described above with respect to FIGS. 2A-2C, the display unit signaling module 415 may signal the display unit (e.g., the display 313) to rotate the contents being displayed thereon such that the orientation of the contents is aligned (e.g., substantially horizontal or diagonal) with the orientation of the user's head regardless of whether the user device is positioned in a portrait mode or landscape mode.

In various embodiments, the facial expression determining module 420 may determining a facial expression of the user based on the information identifying and describing the facial landmark. For example, as described above with respect to FIG. 1B, various facial expressions may be identified, such as normal, sad, angry, happy, surprised, puzzled, or frowning. In another embodiment, other facial expressions, such as a wink, a squint, or a smile, may be identified.

In various embodiments, when the facial expression of the user is determined, the function activating module 425 may cause the user device (e.g., the client machine 310, for example, via the processor 311) to activate a different function of a plurality of functions of the user device (e.g., the client machine 110) based on the determined facial expression of the user. For example, in one embodiment, the function activating module 425 may adjust the size of the contents based on determining that the facial expression matches a pre-determined facial expression, such as a squint, looking with the eyes partly closed.

In various embodiments, detection of the facial expression or head orientation of the user may be triggered in response to detecting an orientation change of the user device, such as a change from a first position of a portrait position, a landscape position, and an angled position between the portrait and landscape positions to a second position of these positions. In various embodiments, the facial expression or head orientation may be checked periodically on a specified time interval (e.g., ten seconds, five minutes, and so on) basis. In various embodiments, the change in the user device orientation, facial expression, or head orientation may be recognized as an event that triggers an event handling process, for example, provided by the facial expression determining module 420 or the head orientation determining module 410 such that the detected change can cause, for example, the display unit signaling module 415 or the function activating module 425 to take specified actions (e.g., rotating display orientation or resizing text size and so on). More information regarding the functions of the display management module 319 is provided below with respect to FIGS. 5-6.

Each of the modules described above with respect to FIGS. 3-4 may be implemented by hardware (e.g., circuit), firmware, software or any combinations thereof. Although each of the modules is described above as a separate module, all or some of the modules in FIGS. 3-4 may be implemented as a single entity (e.g., module or circuit) and still maintain the same functionality. Still further embodiments may be realized. Some of these may include a variety of methods. The system 300 and/or its component apparatus (e.g., the client machine(s) 310 or the server machine(s) 330) in FIGS. 3-4 may be used to implement, among other things, the processing associated with the methods 500 and 600 of FIGS. 5-6 discussed below.

Figure 5:
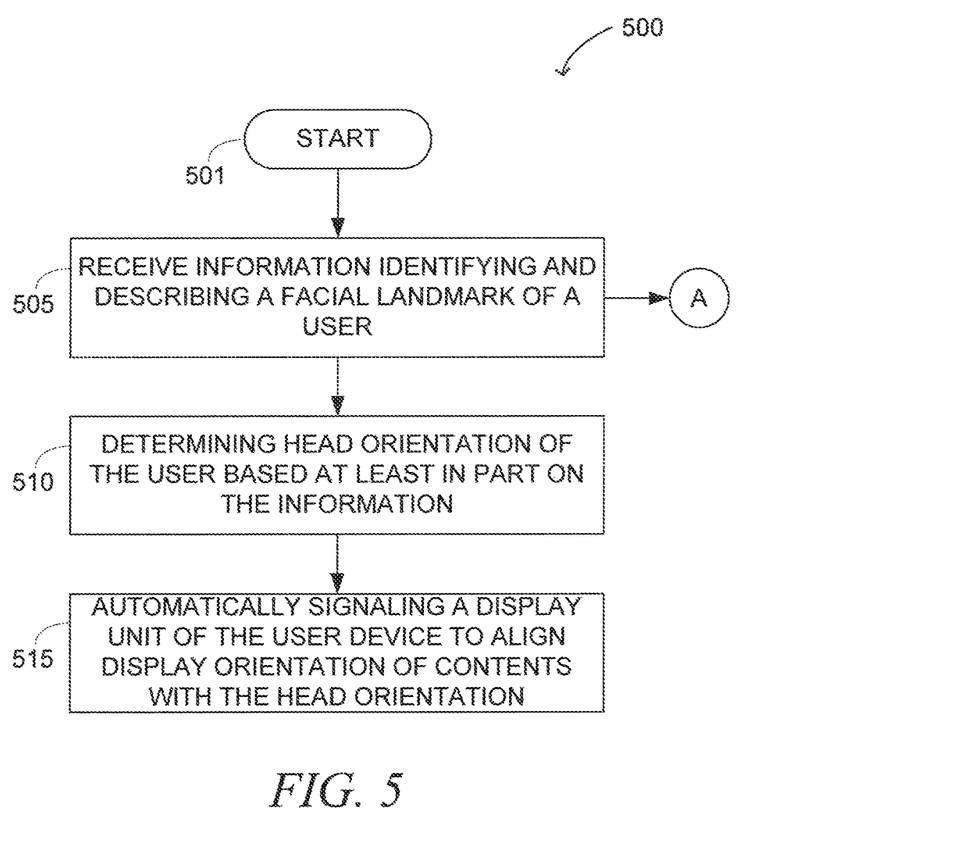
FIG. 5 is a flow diagram illustrating a method for adjusting display orientation based on facial landmark information, according to various embodiments.

FIG. 5 shows a flow diagram illustrating a method 500 at the client machine (e.g., the user device 110) for adjusting display orientation based on facial landmark information, according to various embodiments. For example, in various embodiments, at least one portion of the method 500 may be performed by the display management module 119 of FIG. 3. The method 500 may commence at operation 501 and proceed to operation 505, where information identifying and describing a facial landmark of a user may be received via a user device (e.g., the client machine 310) corresponding to the user. At operation 510, head orientation of the user may be determined based at least in part on the information identifying and describing the facial landmark. At operation 515, a display unit (e.g., the display 313) of the client machine 310 may be automatically signaled to align display orientation of contents being presented with the head orientation as determined based at least in part on the information identifying and describing the facial landmark.

In various embodiments, at operation 505, when the information identifying and describing the facial landmark of the user is received, the user's facial expression may be determined, and a different function of a plurality of functions of the user device may be activated depending on the determined facial expression, at one or more operations labeled "A." More explanations regarding the one or more operations "A" are provided below with respect to FIG. 6.

Figure 6:
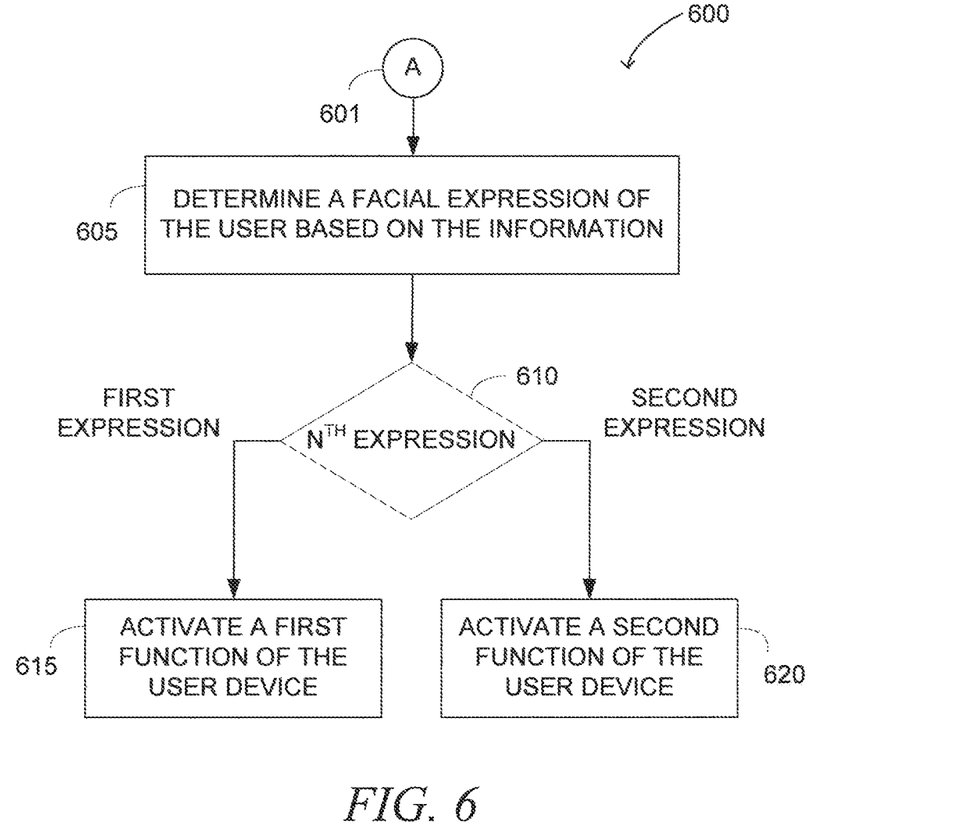
FIG. 6 is a flow diagram illustrating a method for activating functions of a user device based on facial expressions of a user, according to various embodiments.

FIG. 6 shows a flow diagram illustrating a method 600 at the client machine 310 (e.g., the user device 110) for activating functions of the user device based on facial expressions of the user, according to various embodiments. For example, in various embodiments, at least one portion of the method 600 may be performed by the display management module 319 of FIG. 3. The method 600 may commence at operation 601 and proceed to operation 605, where the facial expression of the user may be determined based on the information identifying and describing the facial landmark.

At operation 610, it may be determined whether the facial expression of the user determined at operation 605 matches an Nth (e.g., first, second, third and so on) facial expression.

At operation 615, a first function (e.g., enlarging the size of the texts or images being displayed) of the user device may be activated based on determining that the facial expressions matches a first one (e.g., a squint or a frown) of one or more pre-determined facial expressions (e.g., anger, happiness, surprise, kiss, puzzlement, and so on), as shown by the flow indicated by the left arrow.

At operation 620, a second function (e.g., locking or unlocking the display unit) of the user device may be activated based on determining that the facial expression matches a second one (e.g., a surprise or kiss) of the one or more pre-determined facial expressions, as shown by the flow indicated by the right arrow.

In various embodiments, a method may comprise: receiving, via a user device corresponding to a user, information identifying and describing a facial landmark of the user; determining head orientation of the user based at least in part on the information identifying and describing the facial landmark; and automatically signaling, using one or more processors, a display unit of the user device to align display orientation of contents with the head orientation as determined based at least in part on the information identifying and describing the facial landmark.

In various embodiments, the determining the facial expression may comprise identifying at least one of a wink, a kiss, a squint, a frown, or a smile.

In various embodiments, the automatically signaling may comprise signaling the display unit to rotate a page displayed on the display unit such that the contents in the page remain substantially horizontal in relation to eyes of the user.

In various embodiments, the automatically signaling may comprise: monitoring an angle between the head orientation and the display orientation; refraining from automatically aligning the display orientation based on determining that the angle has not exceeded a threshold value; and performing the automatically aligning of the display orientation based on determining that the angle has exceeded the threshold value.

In various embodiments, the method may further comprise: determining a facial expression of the user based on the information identifying and describing the facial landmark; activating a first function of the user device based on determining that the facial expressions matches a first one of one or more pre-determined facial expressions; and activating a second function of the user device based on determining that the facial expression matches a second one of the one or more pre-determined facial expressions.

In various embodiments, the method may further comprise: determining a facial expression of the user based on the information identifying and describing the facial landmark; and activating a user interface to receive a feedback from the user based on determining that the facial expression matches a pre-determined facial expression.

In various embodiments, the method may further comprise: determining a facial expression of the user based on the information identifying and describing the facial landmark; and adjusting the size of the contents based on determining that the facial expression matches a pre-determined facial expression.

In various embodiments, the method may further comprise: determining a facial expression of the user based on the information identifying and describing the facial landmark; and locking or unlocking the display unit based on determining that the facial expression matches a pre-determined facial expression.

In various embodiments, the method may further comprise: processing the information identifying and describing the facial landmark to identify a facial expression; and adjusting the brightness of the display unit based on matching the facial expression to a squint or a frown.

In various embodiments, the adjusting of the brightness of the display unit may comprise determining the size of the pupils of the user.

In various embodiments, the method may further comprise calculating the distance between the display unit and the eyes of the user based at least in part on the information identifying and describing the facial landmark.

In various embodiments, the calculating of the distance between the display unit and the eyes of the user may comprise presenting a notification via the user device based on determining that the distance is less than a threshold value (e.g., twenty inches or fifty centimeters). Other embodiments are possible.

The methods 500 and/or 600 may be performed by processing logic that may comprise hardware (e.g., dedicated logic, programmable logic, microcode, etc.), such as at least one processor, software (such as run on a general purpose computing system or a dedicated machine), firmware, or any combination of these. It is noted that although the methods 500 and 600 are explained above with respect to the client machine 310 (e.g., the user device 110) including the display management module 319 in FIG. 3, those skilled in the art will recognize that the methods 500 and/or 600 may be performed by other systems and/or devices that provide substantially the same functionalities as the client machine 310 (e.g., the user device 110).

Although only some activities are described with respect to FIGS. 5 and 6, the methods 500 and 600, according to various embodiments, may perform other activities, such as operations performed by the camera 315 (e.g., the front-facing camera 115) and/or the server machine 330 (or the network-based publication system 320 therein) in FIG. 3, in addition to and/or in alternative to the activities described with respect to FIGS. 5 and 6.

The methods 500 and 600 described herein do not have to be executed in the order described, or in any particular order. Moreover, various activities described with respect to the methods 500 and 600 identified herein may be executed in repetitive, serial, heuristic, or parallel fashion, or any combinations thereof. The individual activities of the methods 500 and 600 shown in FIGS. 5 and 6 may also be combined with each other and/or substituted, one for another, in various ways. Information, including parameters, commands, operands, and other data, may be sent and received between corresponding modules or elements in the form of one or more carrier waves. Thus, many other embodiments may be realized.

In various embodiments, the methods 500 and 600 shown in FIGS. 5 and 6 may be implemented in various devices, as well as in a machine-readable medium, such as a storage device, where the methods 500 and 600 are adapted to be executed by one or more processors. Further details of such embodiments are described below with respect to FIG. 7.

Figure 7:
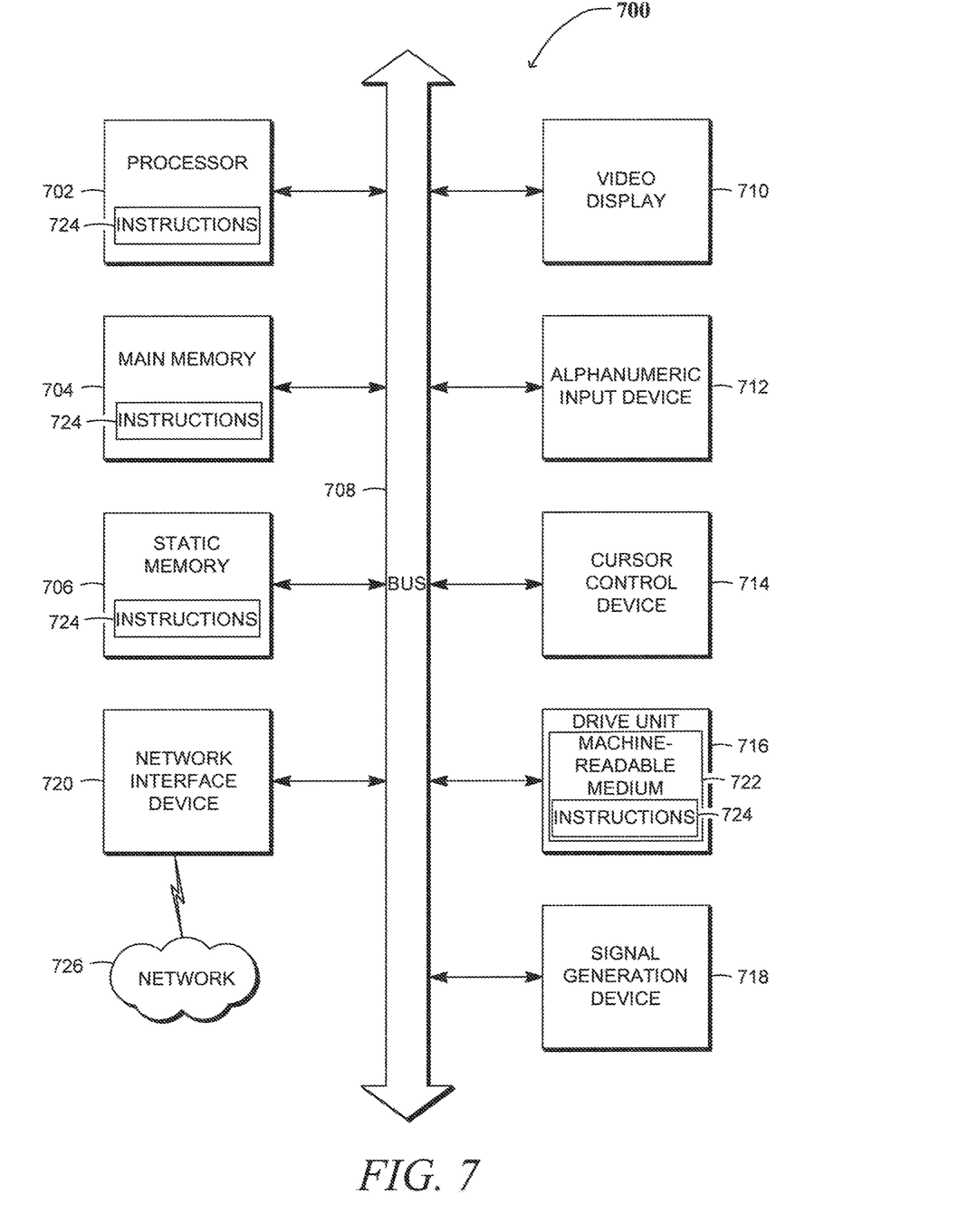
FIG. 7 is a diagrammatic representation of a machine in the example form of a computer system, according to various embodiments.

FIG. 7 is a diagrammatic representation of a machine (e.g., the client machine(s) 310 or the server machine(s) 330) in the example form of a computer system 700, according to various embodiments, within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a user device in a server-client network environment, or as a peer machine in a peer-to-peer (or distributed) network environment. The machine may be a server computer, a client computer, a PC, a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700, comprising an article of manufacture, may include a processor 702, such as the processor 311, (e.g., a central processing unit (CPU), a graphics processing unit (GPU), or both), a main memory 704 and a static memory 706, such as the memory 317, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker or an antenna), and a network interface device 720.

The disk drive unit 716 may include a machine-readable medium 722 on which is stored one or more sets of instructions 724 (e.g., software) embodying any one or more of the methodologies or functions described herein. The instructions 724 may also reside, completely or at least partially, within the main memory 704, static memory 706, and/or within the processor 702 during execution thereof by the computer system 700, with the main memory 704, static memory 706 and the processor 702 also constituting machine-readable media. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium, such as a storage device, that is capable of storing, encoding, or carrying a set of instructions for execution by the machine and that cause the machine to perform any one or more of the methodologies of various embodiments disclosed herein. The term "machine-readable medium" shall accordingly be taken to include, but not be limited to, solid-state memories, optical media, and magnetic media.

Thus, a method, apparatus, and system for adjusting display orientation based on facial landmark information have been provided. Although the method, apparatus, and system have been described with reference to specific example embodiments, it will be evident that various modifications and changes may be made to these embodiments without departing from the broader spirit and scope thereof. The various modules and/or engines described herein may be implemented in hardware, software, or a combination of these. Accordingly, the specification and drawings are to be regarded in an illustrative rather than a restrictive sense.

According to various embodiments, a plurality of viewing (e.g., reading) directions may be provided for contents being displayed via a user device, such as left-to-right, right-to-left, bottom-to-top, and top-to-bottom readings. This allows a user of the user device to view (e.g., read) the contents from any posture (e.g., lying on a sofa or resting his head on a pillow) with enhanced efficiency and comfort without having to change his posture to align his head substantially vertical (e.g., with eyes being oriented substantially horizontal). Higher frequency of use and/or enhanced user experiences with respect to the user device may result.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus comprising:
   a display unit to display contents; and
   one or more processors to execute a display management module, the display management module configured to:
     detect a change in a device orientation of the apparatus;
     receive information identifying and describing a facial landmark of a user, in response to the change in the device orientation;
     perform a comparison of the information identifying and describing the facial landmark of the user with preregistered facial feature recognition information associated with the user;
     determine a facial expression and a head orientation of the user based at least in part on the information identifying and describing the facial landmark, in response to the comparison of the information identifying and describing the facial landmark with the preregistered facial feature recognition information associated with the user;
     determine the head orientation transgresses a threshold time value;
     access a function of the apparatus associated with the facial expression and the head orientation, in response to the head orientation transgressing the threshold time value, the function including a security function; and
     perform the security function associated with the facial expression and the head orientation, wherein the security function includes locking the display unit of the user device based on determining that the facial expression matches a facial expression from among the preregistered facial feature recognition information associated with the user.

2. The apparatus of claim 1, wherein the information identifying and describing the facial landmark comprises:
   information identifying and describing at least one of hairs, eyebrows, eyes, glasses, ears, a forehead, a nose or a mouth of the user.

3. The apparatus of claim 1, wherein the display management module is configured to determine the head orientation based at least in part on shape and position information included in the information identifying and describing the facial landmark.

4. The apparatus of claim 1, further comprising:
   memory to store data identifying and describing facial landmarks of a plurality of other users.

5. The apparatus of claim 4, wherein the display management module is configured to determine the head orientation based at least in part on comparing the facial landmark of the user with at least a portion of facial landmarks of the plurality of other users.

6. The apparatus of claim 1, further comprising: a camera to capture the information identifying and describing the facial landmark.

7. The apparatus of claim 1, wherein the display management module is further configured to:
   receive information identifying and describing a plurality of facial landmarks of the user;
   calculate, based on the information identifying and describing the plurality of facial landmarks of the user, a relative location for each of the plurality of facial landmarks; and
   determine the head orientation based at least in part on the relative location for each of the plurality of facial landmarks.

8. A method comprising:
   detecting a change in a device orientation;
   receiving, via a user device corresponding to a user, information identifying and describing a facial landmark of the user, in response to the change in the device orientation;
   performing a comparison of the information identifying and describing the facial landmark of the user with preregistered facial feature recognition information associated with the user;
   determining a facial expression and a head orientation of the based at least in part on the information identifying and describing the facial landmark, in response to the comparison of the information identifying and describing the facial landmark with the preregistered facial feature recognition information associated with the user;
   determining the head orientation transgresses a threshold time value;
   accessing a function of the user device associated with the facial expression and the head orientation, in response to the head orientation transgressing the threshold time value, the function including a security function; and
   performing the security function associated with the facial expression and the head orientation at the user device, wherein the security function includes locking or unlocking the display unit of the user device based on determining that the facial expression matches a facial expression from among the preregistered facial feature recognition information associated with the user.

9. The method of claim 8, wherein the function is a first function, and the method further comprises:
determining the facial expression of the user based on the information identifying and describing the facial landmark;
activating the first function of the user device based on determining that the facial expressions matches a first facial expression from among the preregistered facial feature recognition information associated with the user; and
activating a second function of the user device based on determining that the facial expression matches a second facial expression from among the preregistered facial feature recognition information associated with the user.

10. The method of claim 9, wherein the determining the facial expression comprises:
identifying at least one of a wink, a squint, a frown, or a smile.

11. The method of claim 8, further comprising:
determining a facial expression of the user based on the information identifying and describing the facial landmark; and
activating a user interface to receive a feedback from the user based on determining that the facial expression matches a facial expression from among the preregistered facial feature recognition information associated with the user.

12. The method of claim 8, further comprising:
determining a facial expression of the user based on the information identifying and describing the facial landmark; and
adjusting the size of the presentation of the content based on determining that the facial expression matches a facial expression from among the preregistered facial feature recognition information associated with the user.

13. The method of claim 8, further comprising:
processing the information identifying and describing the facial landmark to identify a facial expression; and
adjusting brightness of the display unit based on matching the facial expression to a squint or a frown.

14. The method of claim 13, wherein the adjusting comprises:
determining a size of pupils of the user based on the information identifying and describing the facial landmark of the user.

15. The method of claim 8, further comprising:
calculating a distance between the display unit and eyes of the user based at least in part on the information identifying and describing the facial landmark.

16. The method of claim 15, wherein the calculating comprises:
presenting a notification via the user device based on determining that the distance is less than a threshold time value.

17. A non-transitory machine-readable storage device storing instructions that, when executed by one or more processors, cause the one or more processors to perform operations comprising:
detecting a change in a device orientation;
receiving, via a user device corresponding to a user, information identifying and describing a facial landmark of the user, in response to the change in the device orientation;
performing a comparison of the information identifying and describing the facial landmark of the user with preregistered facial feature recognition information associated with the user;
determining a facial expression and a head orientation of the based at least in part on the information identifying and describing the facial landmark, in response to the comparison of the information identifying and describing the facial landmark with the preregistered facial feature recognition information associated with the user;
determining the head orientation transgresses a threshold time value;
accessing a function of the user device associated with the facial expression and the head orientation, in response to the head orientation transgressing the threshold time value, the function including a security function; and
performing the security function associated with the facial expression and the head orientation at the user device, wherein the security function includes locking the display unit of the user device based on determining that the facial expression matches a facial expression from among the preregistered facial feature recognition information associated with the user.

* * * * *